No. 789,734. Patented May 16, 1905.

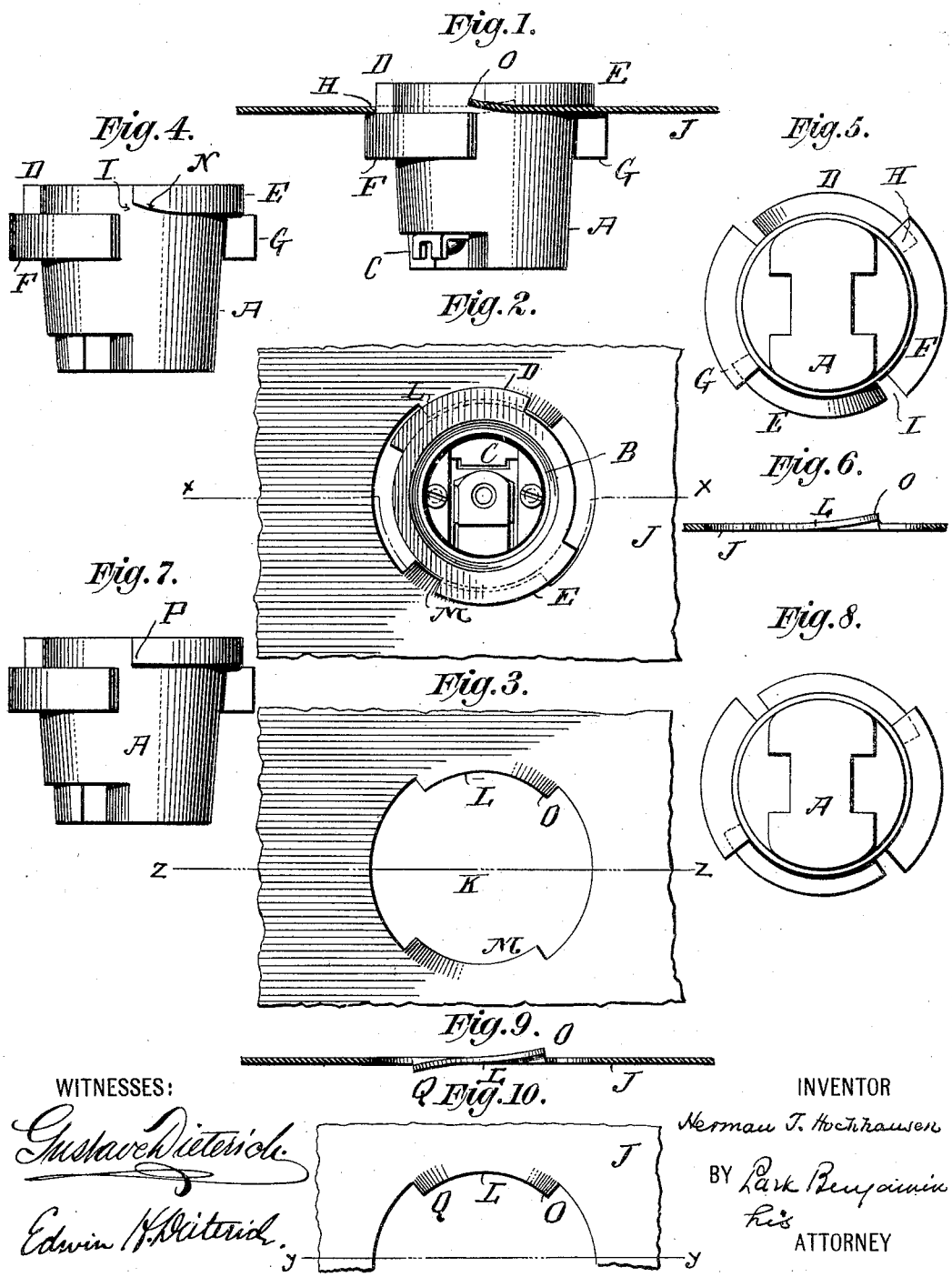

UNITED STATES PATENT OFFICE.

HERMAN T. HOCHHAUSEN, OF BROOKLYN, NEW YORK.

GLOW-LAMP-SOCKET HOLDER.

SPECIFICATION forming part of Letters Patent No. 789,734, dated May 16, 1905.

Application filed January 28, 1905. Serial No. 243,060.

*To all whom it may concern:*

Be it known that I, HERMAN T. HOCHHAUSEN, of Brooklyn, Kings county, New York, have invented a new and useful Improvement in Glow-Lamp-Socket Holders, of which the following is a specification.

The invention relates to the holding of electric glow-lamps upon a plate or other support.

The invention consists in the construction of the lamp-socket and of the plate or support having an opening to receive said socket, as more particularly pointed out in the claims.

The object of the invention is to enable the lamp-sockets to be readily attached to or detached from the holding-plate and to be firmly secured when in place thereon.

In the accompanying drawings, Figure 1 shows the socket in side elevation and the holding-plate in section on the line $x\,x$ of Fig. 2. Fig. 2 is a plan view of the holding-plate with the socket in place. Fig. 3 is a plan view of the plate separately. Fig. 4 is a side elevation of the socket separate from the holding-plate. Fig. 5 is a bottom view of the socket shown in Fig. 4. Fig. 6 is a cross-section of the holding-plate on line $z\,z$ of Fig. 3. Fig. 7 is a side elevation of a modified form of the socket. Fig. 8 is a bottom view of the socket shown in Fig. 7. Fig. 9 is a cross-section of a modified form of holding-plate on the line $y\,y$ of Fig. 10. Fig. 10 is a plan view of the same.

Similar letters of reference indicate like parts.

The lamp-socket A is, as usual, substantially cylindrical or frusto-conical, is preferably of porcelain, and is provided with the usual internal threaded metal lining B and also with the ordinary circuit connections C.

On the rim of the socket are two oppositely-placed arc-shaped flanges D E. Extending from the outer periphery of the socket are two oppositely-placed arc-shaped projections F and G. The rim-flange D meets and overlaps the projection F at one end, as shown at H in Figs. 1 and 5, and similarly the rim-flange E at its corresponding end meets and overlaps the flange G. The lengths of the arc-shaped flanges and projections, measured on their outer peripheries, are such that an interval I, Figs. 4 and 5, is left between the non-overlapping end of rim-flange E and the end of projection F, and a similar interval is left between the non-overlapping end of rim-flange D and the end of projection G.

The holding-plate J for the socket is preferably of thin metal and is provided with an opening K of suitable shape and size to receive the rim-flanges D E and to allow them to pass through until the flanges F and G meet the back of the plate, as shown in Fig. 1.

The socket is secured in the plate by rotating it on its axis so that the rim-flanges D and E ride over and become wedged upon the portions L and M of the plate J which project within the opening K. (See Figs. 1 and 2.) In order to conveniently cause the ends of the rim-flanges to pass over and become wedged upon the projections L and M, I may bevel the under sides of the ends of the said flanges, as shown at N in Fig. 4, and to still further secure the wedge action I may slightly raise the ends of the projections L and M, as shown at O in Figs. 1, 3, and 6. Instead of beveling off the ends of the rim-flanges, as shown at N in Fig. 4, I may leave the ends square, as represented at P, Fig. 7, and in such case I may bend down one end of the projections L and M, as shown at Q in Figs. 9 and 10. The other ends of the projections L and M may be flat or may be raised, as shown at O. In all cases the object is to permit the holding-plate D to become tightly wedged between the rim-flanges D and E and the projections F and G of the socket. The socket is thus prevented from becoming loose. By turning it back to its original position it may of course be readily removed from the holding-plate. The holding-plate D may contain a number of openings, such as K, and thus receive a plurality of lamps, and it may be a part of any structure to which lamps are ordinarily applied—as, for example, the back of a sign-board on which the lamps are arranged to form letters or other device.

I claim—

1. The combination of a glow-lamp socket of substantially cylindrical form, having two oppositely-disposed arc-shaped rim-flanges, and two arc-shaped projections on its periphery respectively lapping said rim-flanges at one end, and a holding-plate for said socket having an opening constructed and shaped to permit said rim-flanges, but not said arc-shaped projections, to pass through it and to permit said socket to be rotated to bring said rim-flanges over the portions of said plate projecting within said opening.

2. The combination of a glow-lamp socket of substantially cylindrical form, having two oppositely-disposed arc-shaped rim-flanges each beveled on its under side at one end, and two arc-shaped projections on its periphery respectively lapping said rim-flanges at their non-beveled ends, and a holding-plate for said socket having an opening constructed and shaped to permit said rim-flanges, but not said arc-shaped projections, to pass through it and to permit said socket to be rotated to bring said rim-flanges over the portions of said plate projecting within said opening.

3. The combination of a glow-lamp socket of substantially cylindrical form having two oppositely-disposed arc-shaped rim-flanges and two arc-shaped projections on its periphery respectively overlapping said rim-flanges at one end and a holding-plate for said socket having an opening constructed and shaped to permit said rim-flanges, but not said arc-shaped projections, to pass through it, and to permit said socket to be rotated to bring said rim-flanges over the portions M L of said plate projecting within said opening; the said openings having their corresponding ends bent downwardly.

4. The combination of a glow-lamp socket of substantially cylindrical form having two oppositely-disposed arc-shaped rim-flanges and two arc-shaped projections on its periphery respectively overlapping said rim-flanges at one end and a holding-plate for said socket having an opening constructed and shaped to permit said rim-flanges, but not said arc-shaped projections, to pass through it, and to permit said socket to be rotated to bring said rim-flanges over the portions M L of said plate projecting within said opening; the said projections M L having two corresponding ends bent upwardly.

5. The combination of a glow-lamp socket of substantially cylindrical form having two oppositely-disposed arc-shaped rim-flanges and two arc-shaped projections on its periphery respectively overlapping said rim-flanges at one end and a holding-plate for said socket having an opening constructed and shaped to permit said rim-flanges, but not said arc-shaped projections, to pass through it, and to permit said socket to be rotated to bring said rim-flanges over the portions M L of said plate projecting within said opening; the said projections M L having two corresponding ends bent upwardly and two corresponding ends bent downwardly.

In testimony whereof I have signed my name to this specification in the presence of two subscribing witnesses.

HERMAN T. HOCHHAUSEN.

Witnesses:
   WM. H. SIEGMAN,
   PARK BENJAMIN, Jr.